US010696095B2

(12) United States Patent
Curry

(10) Patent No.: US 10,696,095 B2
(45) Date of Patent: Jun. 30, 2020

(54) FOAM TIRE FLAP FOR LOW PRESSURE APPLICATIONS

(71) Applicant: James E. Curry, Glendale, CA (US)

(72) Inventor: James E. Curry, Glendale, CA (US)

(*) Notice: Subject to any disclaimer, the term of this patent is extended or adjusted under 35 U.S.C. 154(b) by 215 days.

(21) Appl. No.: 14/275,489

(22) Filed: May 12, 2014

(65) Prior Publication Data

US 2015/0321525 A1 Nov. 12, 2015

(51) Int. Cl.
*B60C 1/00* (2006.01)
*B60B 21/12* (2006.01)
*B60C 15/028* (2006.01)
*B60C 19/12* (2006.01)

(52) U.S. Cl.
CPC .............. *B60C 1/00* (2013.01); *B60B 21/12* (2013.01); *B60C 15/028* (2013.01); *B60C 19/127* (2013.01); *B60C 2200/10* (2013.01); *B60C 2200/14* (2013.01); *Y10T 152/10657* (2015.01)

(58) Field of Classification Search
CPC ....... B60C 1/00; B60C 15/028; B60C 19/127; B60C 2200/14; B60C 2200/10; B60B 21/12; Y10T 152/10657
See application file for complete search history.

(56) References Cited

U.S. PATENT DOCUMENTS

| | | | |
|---|---|---|---|
| 1,467,313 A | 9/1923 | Gammeter | |
| 1,475,147 A | 11/1923 | Shively | |
| 1,575,479 A | 3/1926 | Hauvette-Michelin | |
| 1,589,301 A | 6/1926 | Hauvette-Michelin | |
| 1,620,818 A | 3/1927 | Jacobs | |
| 1,658,646 A | 2/1928 | Michelin | |
| 2,773,535 A | 12/1956 | Tolonen | |
| 3,150,704 A | 9/1964 | Daw | |
| 3,533,461 A | 10/1970 | Boileau | |
| 3,866,653 A * | 2/1975 | Lejeune | B60B 21/12 152/204 |
| 4,063,584 A | 12/1977 | Takigawa | |
| 4,453,581 A | 6/1984 | Easterly | |
| 4,667,720 A | 5/1987 | Berillon et al. | |
| 5,073,444 A | 12/1991 | Shanelec | |
| 5,591,283 A * | 1/1997 | Mahling | B60C 15/06 152/501 |
| 5,679,184 A | 10/1997 | Hosking | |

(Continued)

FOREIGN PATENT DOCUMENTS

| | | | |
|---|---|---|---|
| CA | 1116988 | * | 5/1978 |
| JP | H05-169910 A1 | | 7/1993 |
| JP | 05-319009 | * | 12/1993 |

OTHER PUBLICATIONS

Metro Foam Products, 2014; Polyethylene Foam; Retrieved from the internet <URL:http://web.archive.org/web/20140423193340/http://metrofoam.com.au/polyethylene-foam.html>.

*Primary Examiner* — Kevin R Kruer

(57) ABSTRACT

The present invention is a unique tire flap for use on off-road vehicle wheel assemblies utilizing standard safety rims, tires, rim locks, and inner tubes, so that the vehicles can operate in high performance off-road conditions under low or extremely low tire pressures (4psi-10psi), without incurring flats due to a pinched tube. The tire flap of the present invention is made from low density impact absorbent foam, such that the flap absorbs the energy of a first and second type pinch tire condition that prevents the inner tube from rupturing.

12 Claims, 12 Drawing Sheets

(56) References Cited

U.S. PATENT DOCUMENTS

| | | |
|---|---|---|
| 6,896,020 B1 | 5/2005 | Summers |
| 7,669,627 B2 | 3/2010 | Douglas |
| 2006/0234033 A1* | 10/2006 | Nishikawa ............ B29C 47/0019 428/314.8 |

* cited by examiner

PRIOR ART

FOAM TIRE FLAP FOR LOW PRESSURE APPLICATIONS

FIELD OF THE INVENTION

This invention relates in general to a tire flap for use on an inner tube type tire and rim for vehicles operated in off-road conditions wherein the inner tube is inflated at a low tire pressure. The flap protects the tube from flats due to tire pinching that commonly occurs between the rim, tube, and tire when the tube is inflated at a low pressure.

BACKGROUND OF THE INVENTION

A conventional off-road vehicle such as a motorcycle is commonly known to have wheel assemblies having an inner tube associated therewith. It is well known that operating such vehicles at low tire pressures (between 4 psi and 10 psi) is advantageous in providing optimal traction. However, at such low tire pressures the tube is often subject to being pinched by deformation of the tire against the rim or by being pinched between the tire bead and the rim. This problem is particularly acute under high performance off-road conditions. Extremely low tire pressures (between 4 psi and 7 psi) are desirable, but not practical as a pinch flat is almost guaranteed. As a result, it is common for such conventional off-road vehicles to operate at higher, less desirable tire pressures (between about 12 psi and 18 psi), in order to eliminate the potential of a flat tire due to tube pinches.

The most common approach to avoid tube pinches is to utilize thick, heavy duty inner tubes under the theory that the additional thickness of the inner tube will better resist tearing/pinching. However, such tubes are still prone to pinching at low or extremely low tire pressure and undesirably add additional weight to the tire assembly. A first approach, as disclosed in U.S. Pat. No. 5,073,444, is to eliminate the tube entirely and insert a generally solid molded foam core that is sufficiently flexible to provide a similar low pressure feel for optimal traction. Michelin and Dunlop corporations offer such foam tire inserts made of closed cell butyl honeycomb foam filled with nitrogen gas having a smooth skin outer surface that must be drenched with a lubricant upon installation. However, such molded foam tire cores are difficult to mount, require a significant amount of lubrication, and add a substantial amount of weight to the tire assembly. They also shrink and disintegrate over time, particularly in extreme high speed competition, requiring frequent replacement. They are also rather expensive, making them generally used by more financially able riders. A second approach, as disclosed in U.S. Pat. No. 6,896,020, is to eliminate the conventional tube and insert a plurality of individually inflated balls into the tire, such that a number of the balls can be pinched without the tire going flat. However, this approach does not provide a simple way to adjust the pressure in the balls to accommodate changes in altitude or temperature, barring complete removal and reinstallation of the balls. Further, installing a plurality of balls into the tire and rim is a challenging process, and combined with their relative expense compared to conventional inner tubes, many riders are discouraged from using them. A third approach, as disclosed in U.S. Pat. No. 7,669,627, is to eliminate the conventional tube and insert a pneumatic sealing ring having an inner tube and expandable liner so that the tire can be inflated like a tubeless tire. However, installing the sealing ring and inner tube can be challenging, and if the bead of the tire or sealing ring is damaged in any way, an air tight seal will not be achieved, resulting in a flat tire. Again, coupled with their relative expense to conventional inner tubes, many riders are discouraged from using them. It should be noted that in the three approaches discussed above, each one of them teaches that to achieve the feel of a low pressurized tire, the conventional inner tube must be eliminated and replaced with something else. None of them address how to eliminate pinch flats incurred by conventional inner tubes.

Therefore, what is desirable is to provide a simple, inexpensive, and easy solution for eliminating tube pinching in conventional off-road vehicles inflated at low tire pressures while keeping the conventional inner tube.

Tire flaps have been used to separate the inner tube from the tire bead and rim for heavy duty motor vehicles. Our research found patents, each of which is cited in an IDS filed concurrently with the application, between the years 1923 and 1956 that teach the use of tire flaps made of vulcanized rubber (or structurally equivalent materials) to protect the inner tube from damage by the rocking of the tire bead, abrasion with the rim, and to prevent entry of foreign material into the rim. Generally, they are a continuous band of solid rubber used in inner tube tire assemblies for vehicles requiring high tire pressures such as between about 35-60 psi. Patents found between the years 1970 to 1984, all of which are cited in the IDS, teach improvements to tire flaps to overcome problems of tube blowouts occurring in tire pressure applications between about 100-110 psi. Again, these teach tire flaps made of generally the same solid vulcanized rubber material as the inner tube, and are only intended to solve the problem of fatigue stress cracks occurring on the inner tube where the tire sidewall deflects somewhat under heavy loads. As will be explained herein, these conventional rubber tire flaps are not designed to prevent pinch flats in off-road vehicles utilizing inner tubes inflated at low tire pressures, nor are they intended for use in such an application.

BRIEF SUMMARY OF THE INVENTION

The present invention introduces for the first time, the use of a unique tire flap for use on off-road vehicle wheel assemblies utilizing standard safety rims, tires, rim locks, and inner tubes, so that the vehicles can operate in high performance off-road conditions under low tire pressures (4 psi-10 psi), without incurring flats due to a pinched tube. The tire flap of the present invention has characteristics that are entirely different from conventional tire flaps used in heavy duty vehicles (18 wheel trucks and the like) operating under high tire pressure applications. The tire flap of the present invention is made from low density impact absorbent foam that can deflect at least about half its thickness and generally return to its original shape. The low density foam of the present invention is also extremely tear resistant to shear loads, and can deflect in shear approximately half its thickness and generally return to its original shape. This is contrary to teachings in the art, in which the tire flaps are made in a thin band of generally rigid, solid vulcanized rubber for use in high tire pressure applications. As will be discussed herein, conventional tire flaps are never subjected to the type of impact loads as the present invention is in conventional off-road vehicles operated at low or extremely low tire pressures.

The present invention provides its benefits across a broad spectrum of tire assemblies utilizing inner tubes operated at low tire pressures. While the description which follows hereinafter pertaining to motorcycles is meant to be representative of such applications, it is not exhaustive. For instance, the present invention can readily be adapted for use on mountain bicycles, and the like. It is intended that this specification and the claims appended hereto be accorded a breadth in keeping with the scope and spirit of the invention being disclosed despite what might appear to be limiting language imposed by the requirements of referring to the specific examples disclosed.

It is one aspect of the present invention to provide a tire flap that absorbs the shear stress of an instantaneous kinetic energy spike of an impact that normally causes a pinch flat.

It is another aspect of the present invention to provide a tire flap material that is much softer than inner tube material, such that in the event of any material tear due to an impact, the tear will be incurred by the tire flap and not the inner tube.

It is a feature of the present invention that the tire flap is made from impact absorbing foam having a density between about 1.2 lb/ft$^3$ and 30.0 lb/ft$^3$.

In a preferred embodiment, it is another feature of the present invention that the wing portions of the tire flap have a distance "$h_f$" that is at least 120% the height "$h_r$" of the vertical lips of the safety rim.

In another embodiment, it is still another feature of the present invention that the tire flap has an initial thickness adjacent the bead of the tire that is at least about 1.5 times the thickness of the inner tube.

It is an advantage of the present invention tire flap that off-road vehicles utilizing conventional safety rims, tires, rim locks, and inner tubes, can operate in high performance off-road conditions under extremely low tire pressures without incurring flats due to a pinched tube.

It is another advantage of the present invention that the tire flap protects the inner tube from damage by a tire iron used to mount or remove the tire from the rim.

It is yet another advantage of the present invention that tire pressure can be adjusted to accommodate changes in altitude, temperature, or the riders preference in the same manner as conventional inner tube tire wheel assemblies are.

It is still yet another advantage of the present invention that the tire flap is extremely lightweight and can be used with the lightest weight thin walled inner tube, thereby reducing the weight and the moment of inertia of the off-road tire assembly.

It is still yet another advantage of the present invention that the tire flap protects against installation and un-installation tube pinches that are frequently incurred by improper use of the tire iron.

These and other aspects, features, and advantages are achieved/attained in the apparatus of the present invention that comprises a flap for an off-road tire mounted on a safety rim having a rim lock with a inner tube installed in between the tire and the rim. The tire flap has a continuous cylindrical C-cup portion having a central aperture for receiving a valve stem of the inner tube. The C-cup portion has wing portions on both ends forming an internally facing surface and an externally facing surface. The tire flap is mounted in a wheel assembly having a tire that has a main section terminating at two beads, and a rim having a generally flat shelf located between two upturned vertical lips in between a downturned arcuate beadwell. The beads of the tire are mounted adjacent the vertical lips of the rim and flat shelf. The internally facing surface of the flap is positioned against the inner tube. The externally facing surface of the flap is positioned against the arcuate beadwell of the rim, the rim lock, and the beads of the tire. In one embodiment, the vertical lips of the rim have a height "$h_r$" and the wing portions extend inward in the tire a distance "$h_f$" of at least 120% the height "$h_r$" of the vertical lip of the rim measured from the flat shelf of the rim.

The flap is made from an impact absorbing foam having a density between 1.2 lb/ft$^3$ and 30.0 lb/ft$^3$. In one embodiment, the flap has an initial thickness "t" adjacent the bead of the tire that is at least about 1.5 times the thickness of the inner tube. In another embodiment, the foam is a polymer foam having a density preferably between 1.2 lb/ft$^3$ and 15.0 lb/ft$^3$ so as to provide enough elasticity and flexibility to assist in installation. In yet another embodiment, the initial thickness "t" adjacent the bead of the tire is at least about 4.0 times the thickness of the inner tube so as to provide a longer life for the tire flap when installed with numerous sets of tires. In yet another embodiment for off-road motorcycle rims, the wing portions extend inward in the tire a distance "$h_f$" of at least between 150% and 225% the height "$h_r$" of the vertical lip of the rim measured from the flat shelf of the rim. This provides enough material near the bead of tire and the rim to prevent the second type pinch flat discussed herein.

Preferably the impact absorbing foam is selected from the group consisting of: expanded polystyrene foam, expanded polyethylene foam, cross-linked polyethylene foam, expanded polypropylene foam, extruded polyethylene foam, polyurethane foam, vinyl nitrile foam, and neoprene. Satisfactory results have been achieved utilizing a cross-linked polyethylene polymer foam having a density of between 1.2 lb/ft$^3$ and 15.0 lb/ft$^3$.

In an alternative embodiment, the internally facing surface of the tire flap is bonded in position on the inner tube so that they can be installed inside the tire assembly as a single flexible piece.

BRIEF DESCRIPTION OF THE DRAWINGS

The aspects, features and advantages of the present invention will become apparent upon consideration of the following detailed disclosure of the invention, especially when it is taken in conjunction with the accompanying drawings wherein.

To facilitate understanding, identical reference numerals have been used, where possible, to designate identical elements or features common to the figures.

DETAILED DESCRIPTION OF THE PREFERRED EMBODIMENTS

Figure 1:
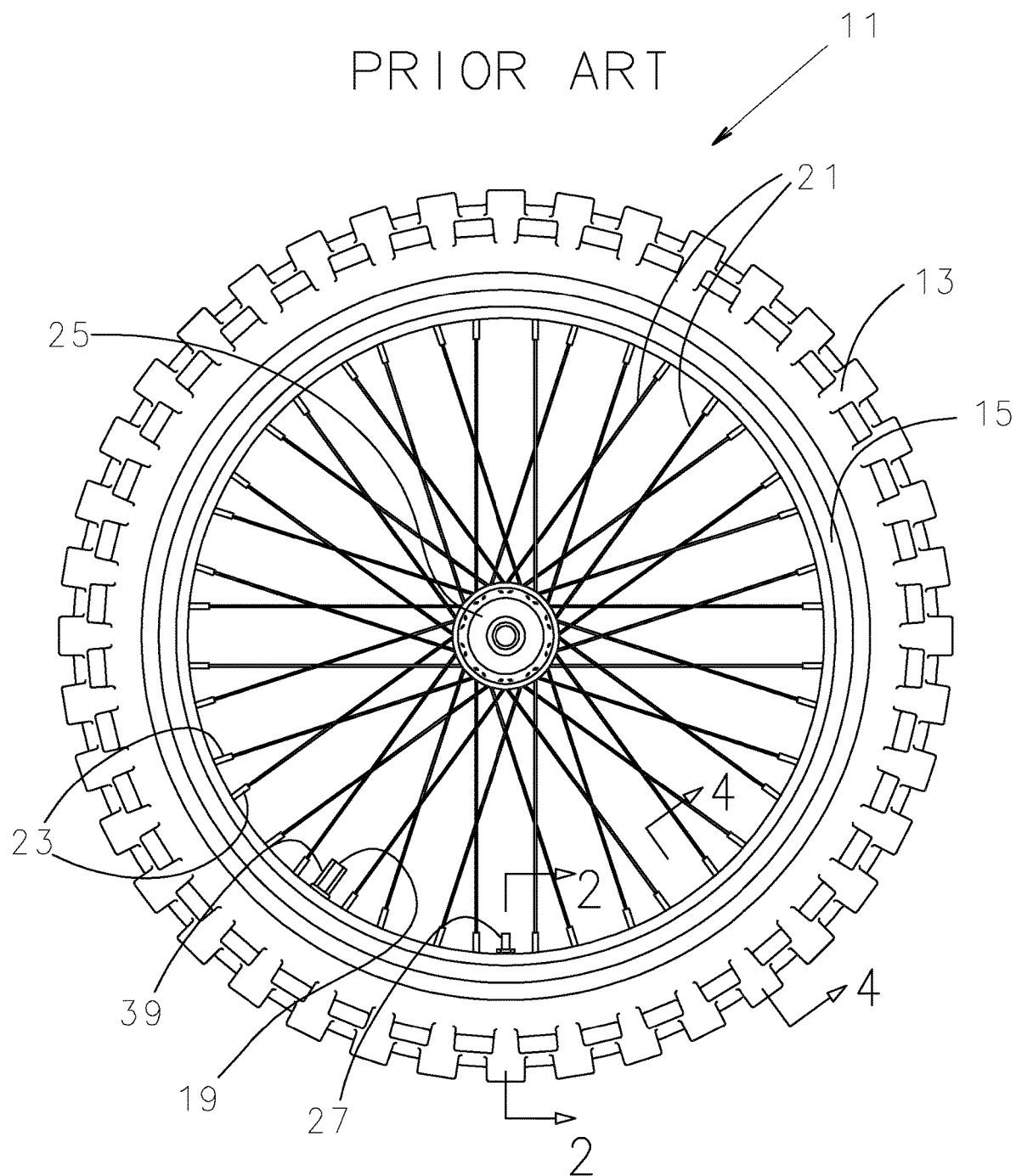
FIG. 1 is a side view of a conventional motorcycle tire, tube, rim, and rim lock assembly.

Referring now to FIGS. 1-7, a typical off-road tire assembly 11 is shown in respect to an analysis of how the inner tube is commonly pinched, particularly under low tire pressures (4 psi-10 psi). The typical tire assembly 11 comprises an off-road tire 13, safety rim 15, inner tube 17, and rim lock 19 (not visible in FIGS. 1-7). The assembly 11 is typically laced with spokes 21 and nipples 23 to a central hub 25. The inner tube 17 includes an integral valve stem 27 for inflating the assembly 11 to a desired tire pressure.

Figure 2:
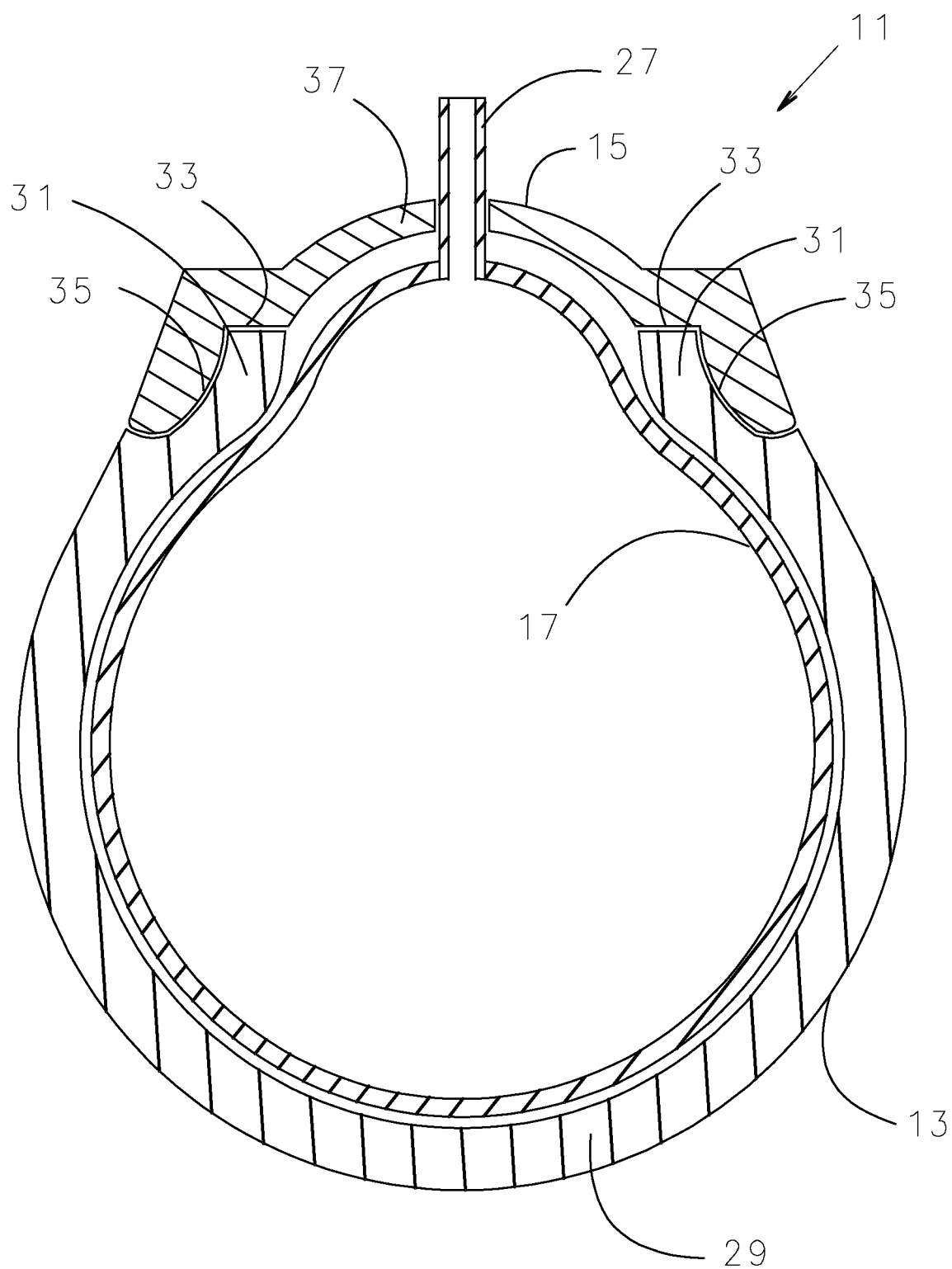
FIG. 2 is a cross-sectional view of the conventional tire assembly of FIG. 1 with the tube deflated.

FIG. 2 shows a cross-section of the assembly 11 with the tube deflated. The tire 13 includes a main section 29 terminating at two beads 31. The safety rim 15 has a generally flat shelf 33 located between two upturned vertical lips 35 in between a downturned arcuate beadwell 37. With the tube deflated, there is an air gap between the main section 29 of the tire and the inner tube 17, as well as an air gap between the inner tube 17 and downturned arcuate beadwell 37. Also, there is an air gap between the tire beads 31 and both the flat shelf 33 and vertical lips 35.

Figure 3:
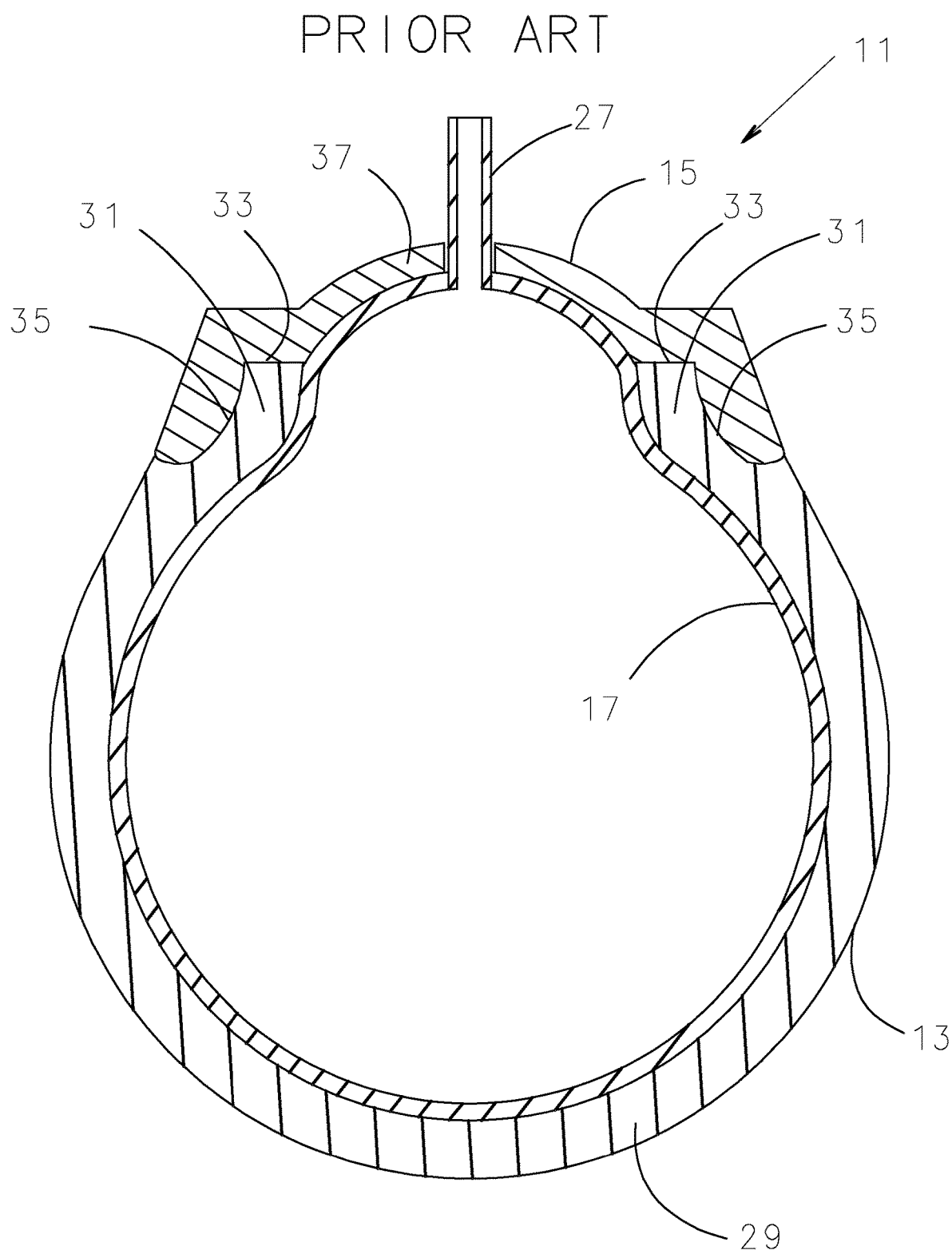
FIG. 3 is the cross-sectional view of FIG. 2 with the tube inflated.

FIG. 3 shows a cross-section of the assembly 11 with the tube 17 inflated. Typically the inner tube 17 is inflated to around 25 psi or more so as to provide enough force to get the beads 31 to seat flush against the shelf 33 and lips 35 of the rim 15. Inflation of the tube 17 effectively eliminates the air gaps shown in FIG. 2, and the rim lock nut 39 is tightened to positively secure a portion of the tire beads 31 against the vertical lips 35 and flat shelf 33 of the rim 15. Pressure is then released from the valve stem 27 to a desired tire pressure, typically between about 10-19 psi. Compared to automobile tires, 10-19 psi is sufficiently low making the rim lock 19 a necessary component in the assembly 11. The rim lock is necessary to prevent spinning of the tire 13 on the rim 15 during acceleration and braking, which can tear the valve stem 27 off the inner tube 17.

Figure 4:
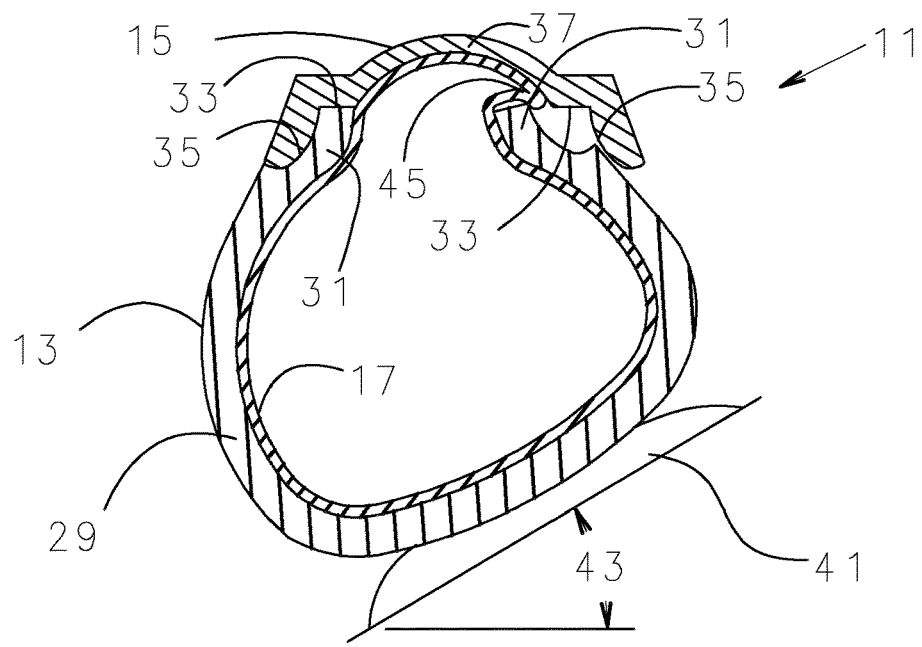
FIG. 4 is a cross-sectional view of FIG. 1 illustrating tire impact with an obstacle that causes a first type pinch flat.
Figure 5:
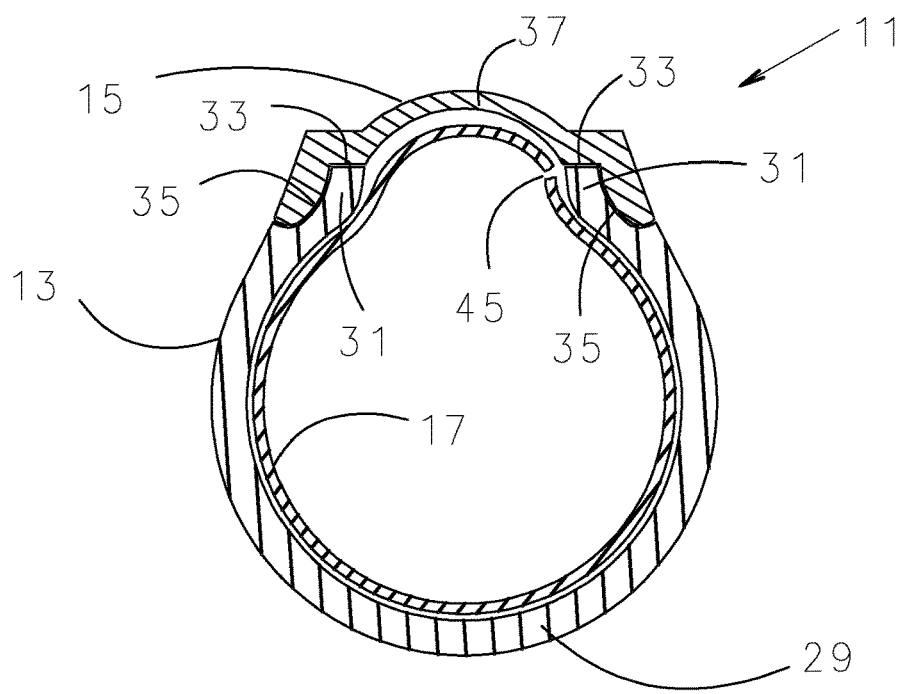
FIG. 5 is the cross-sectional view of FIG. 4 illustrating the location of the first type pinch flat after impact with the obstacle.

Referring to FIGS. 4 and 5, a first type pinch flat is illustrated. In FIG. 4 the assembly 11 is shown impacting obstacle 41 at an angle noted by numeral 43. Under such an impact at low tire pressure, the force generated causes the bead 31 of the tire 13 adjacent the impact to deflect inward into the arcuate beadwell 37. When this occurs, the inner tube 17 gets caught between the bead 31 and the rim 15 at the location shown by numeral 45. Once the assembly 11 clears the obstacle 41, the bead 31 generally snaps back to its original position adjacent the lip 35 and shelf 33, but in so doing the tube is pinched as shown in FIG. 5 at location 45. It is significant to note that the violent impact in this situation generates a nearly instantaneous spike of kinetic energy on location 45 of the tube 17, causing such a large localized shear stress that it tears at this location and looses all air pressure in the assembly 11.

Figure 6:
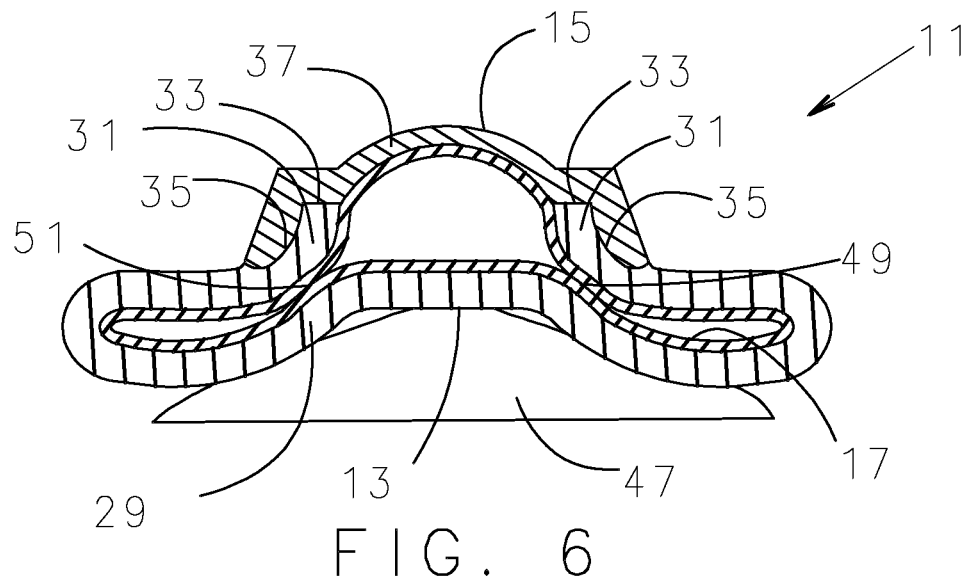
FIG. 6 is the cross-sectional view of FIG. 4 illustrating tire impact with an obstacle that causes a second type pinch flat.
Figure 7:
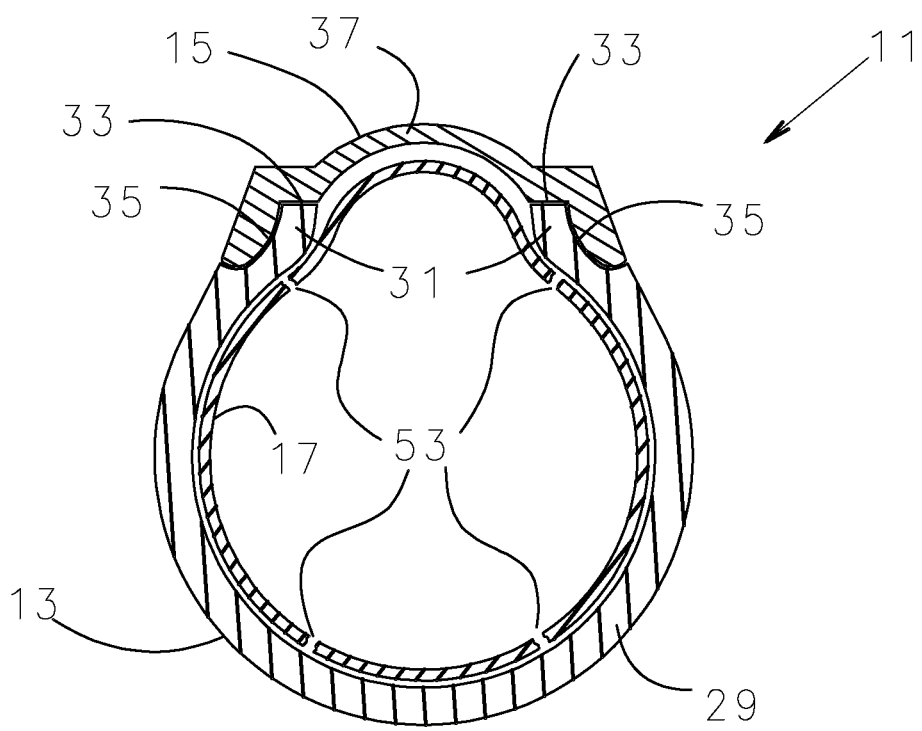
FIG. 7 is the cross-sectional view of FIG. 6 illustrating the locations of the second type pinch flat after impact with the obstacle.

Referring to FIGS. 6 and 7, a second type pinch flat is illustrated. In FIG. 6 the assembly 11 is shown impacting obstacle 47 generally parallel with ends of the vertical lips 35 of the rim 15. Under this impact at low tire pressure, the main section 29 of the tire 13 deflects inward so as to collapse the inner tube 17 on itself at locations 49 and 51 adjacent the beads 31 of the tire 13. Because the beads 31 are secured in the rim 17 against shelf 33 and lips 35, and because the beads 31 and main section 29 of the tire are substantially more rigid than the inner tube 17, the nearly instantaneous spike of kinetic energy at locations 49 and 51 introduce too large a localized shear stress on the inner tube 17, causing the tube to pinch or tear. As shown in FIG. 7, there are four locations on the tube 17 where it can tear under this type of impact, shown by numeral 53, any of which results in a flat tire.

It is to be appreciated to those skilled in the art that the first type pinch flat illustrated in FIGS. 4 and 5, and the second type pinch flat illustrated in FIGS. 6 and 7, are the predominant causes of tube failure in off-road tire assemblies. Furthermore, these types of pinch flats are an acute problem when operating at low tire pressures. The analysis of these types of pinch flats is necessary to illustrate how the unique tire flap of the present invention simply and effectively eliminates these types of tube failures. It is also to be appreciated that these types of tube failures are specifically unique to off-road tire assemblies, and that heavy duty vehicle tires utilizing conventional solid rubber tire flaps and tubes at high inflation rates (60-110 psi) never incur these types of failures.

Figure 8:
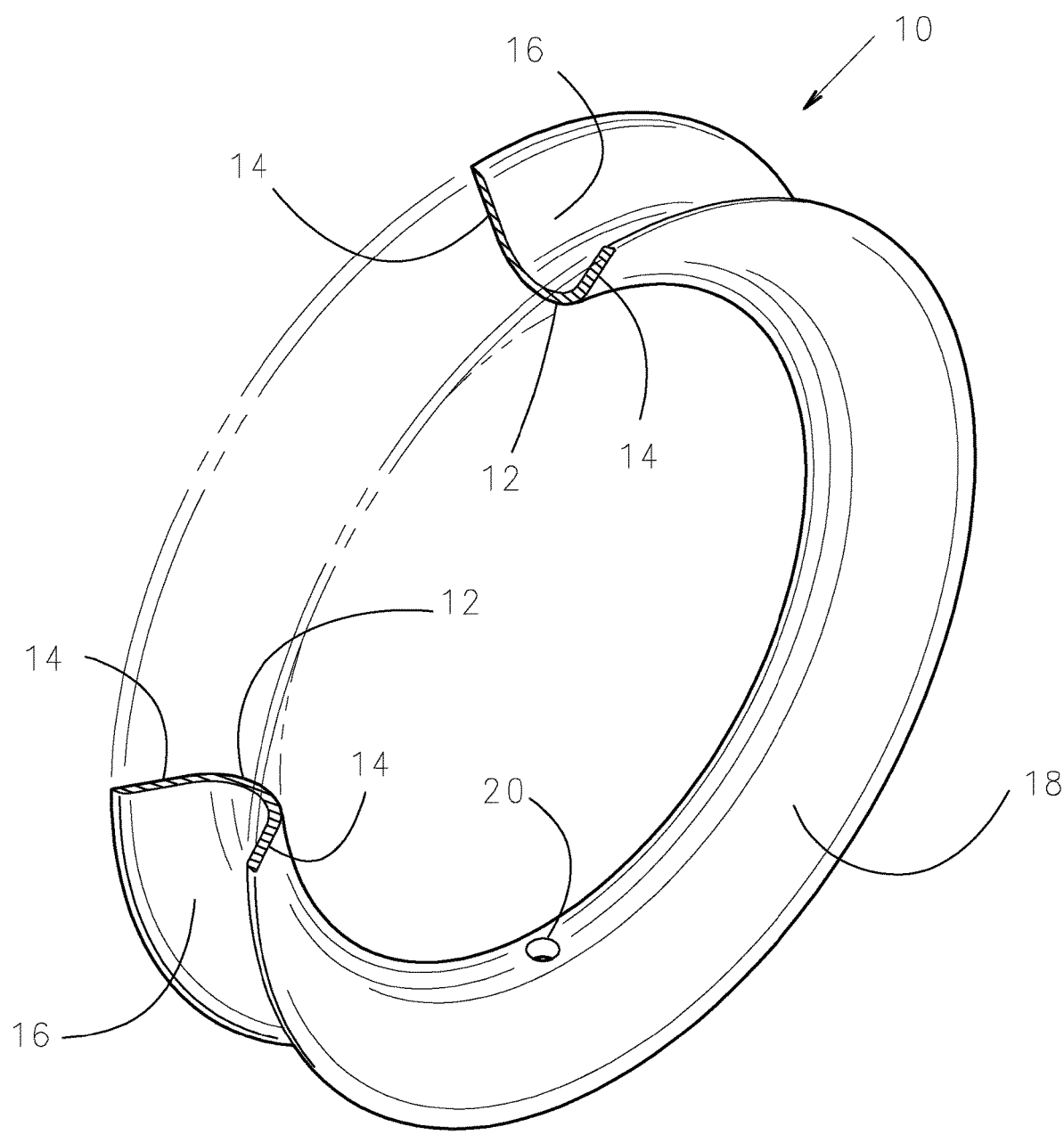
FIG. 8 is a partially sectioned isometric view of the present invention tire flap.
Figure 9:
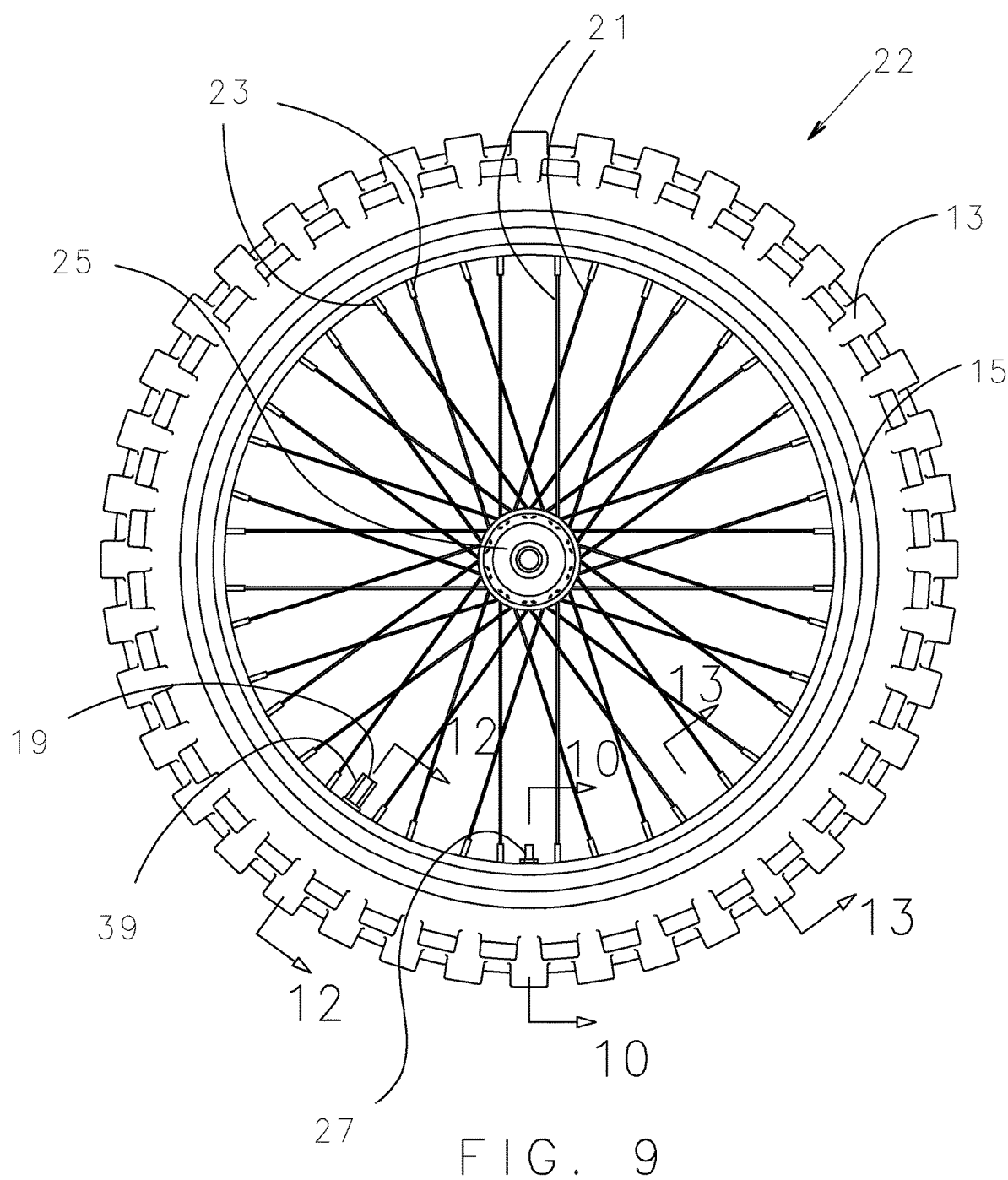
FIG. 9 is a side view of a motorcycle tire, tube, rim, rim lock, and tire flap of the present invention.

Shown in FIG. 8 is the tire flap of the present invention, shown generally by numeral 10. The tire flap 10 has a continuous cylindrical C-cup portion 12 having a wing portion 14 on both ends forming an internally facing surface 16 and an externally facing surface 18. The C-cup portion 12 has a central aperture 20 for receiving a valve stem of the inner tube. The C-cup portion 12 need not be cylindrical, for example it could take on a hexagonal or elliptical shape, or the like. What makes the tire flap 10 unique is that it is made from a low density impact absorbent foam selected to deflect more to impact loads than the rubber material that forms the inner tube 17. The foam material selected must be able to deflect, under an impact load, at least about half its thickness and generally return to its original shape once the impact load is removed, and also deflect in shear, under a shear load, at least about half its thickness and generally return to its original shape once the shear load is removed. Thus, in the two types of pinch flat impacts discussed above, it is intended for the tire flap 10 to absorb the localized shear stress of the instantaneous kinetic energy spike of the impact, not the inner tube 17. Also since the foam of the tire flap 10 is much softer than the inner tube material, any material tear, if any, is intended to be incurred on the tire flap and not the inner tube. Desirably, the selected foam should have good impact absorbing properties and be able to deflect and generally return to its original shape upon deformation. It has been found that low density flexible polymer foams have these characteristics.

Further investigation has found foams having a density between about 1.2 lb/ft$^3$ and 30.0 lb/ft$^3$ exhibit the proper characteristics to prevent the first and second type pinch flats discussed above. This density range is significantly lower than the density of rubber (natural rubber density is generally 0.0343 lb/in$^3$ or 59.27 lb/ft$^3$), the material commonly used in forming inner tubes, conventional tire flaps, and tires. Suitable foams for the present invention tire flap can be expanded polystyrene foam, expanded polyethylene foam, cross-linked polyethylene foam, expanded polypropylene foam, extruded polyethylene foam, polyurethane foam, vinyl nitrile foam, and neoprene. The foam may be open or closed cell foam, but preferably closed cell foam as it is more resistant to water absorption. Polymer foams having a density range of between about 1.2 lb/ft$^3$ and 15.0 lb/ft$^3$ are preferred as they provide the sufficient flexibility and elasticity for ease of installation. Polymer foams in this density range are commonly used in providing shock protection in the packaging of consumer products such as electronic devices. In a preferred embodiment, a closed cell cross-linked polyethylene foam having a density of about 2.0 lb/ft$^3$ has provided satisfactory results in eliminating tube failure under low tire pressures.

Figure 10:
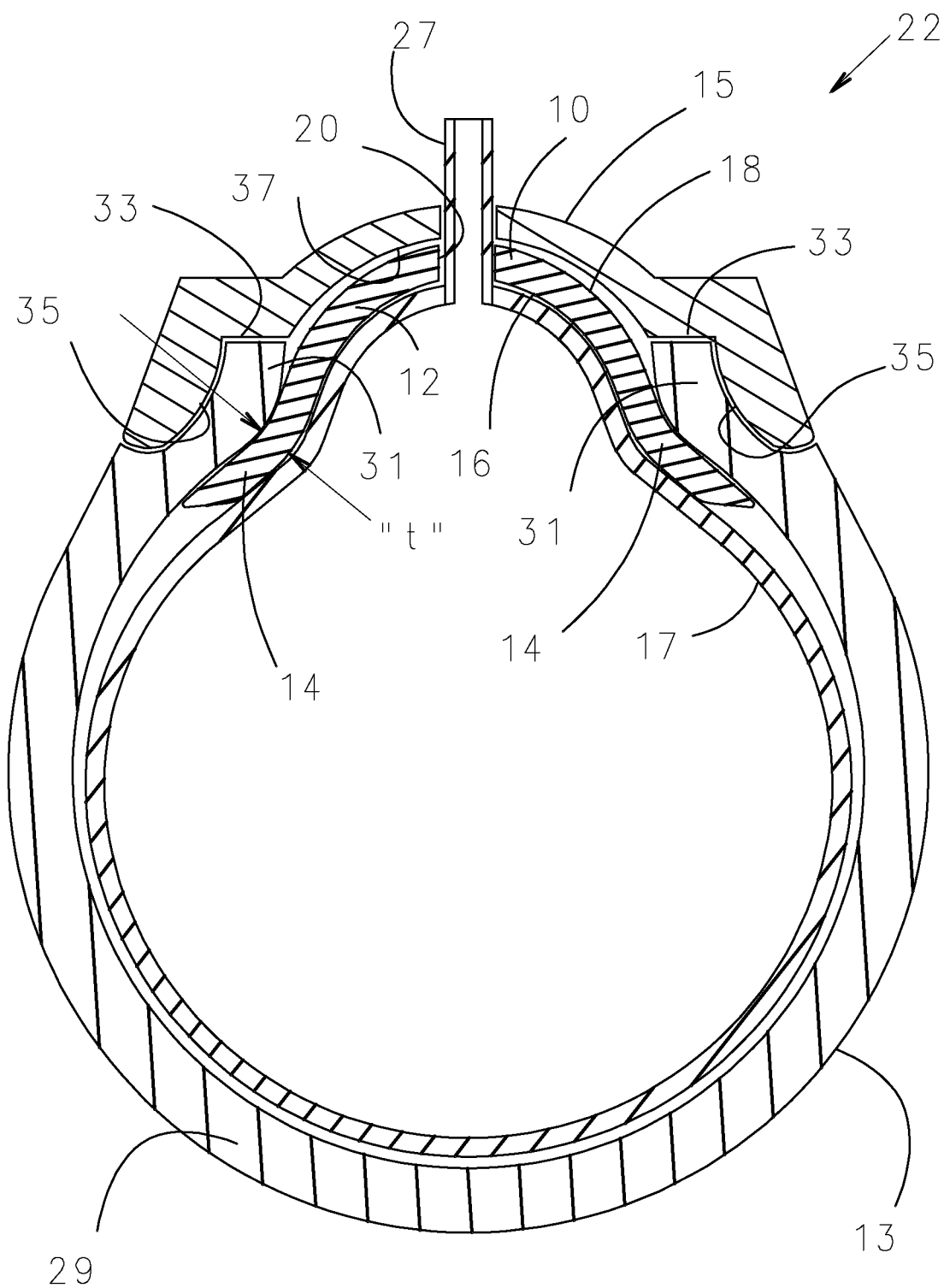
FIG. 10 is a cross-sectional view of FIG. 9 of the present invention at the valve stem with the tube deflated.
Figure 11:
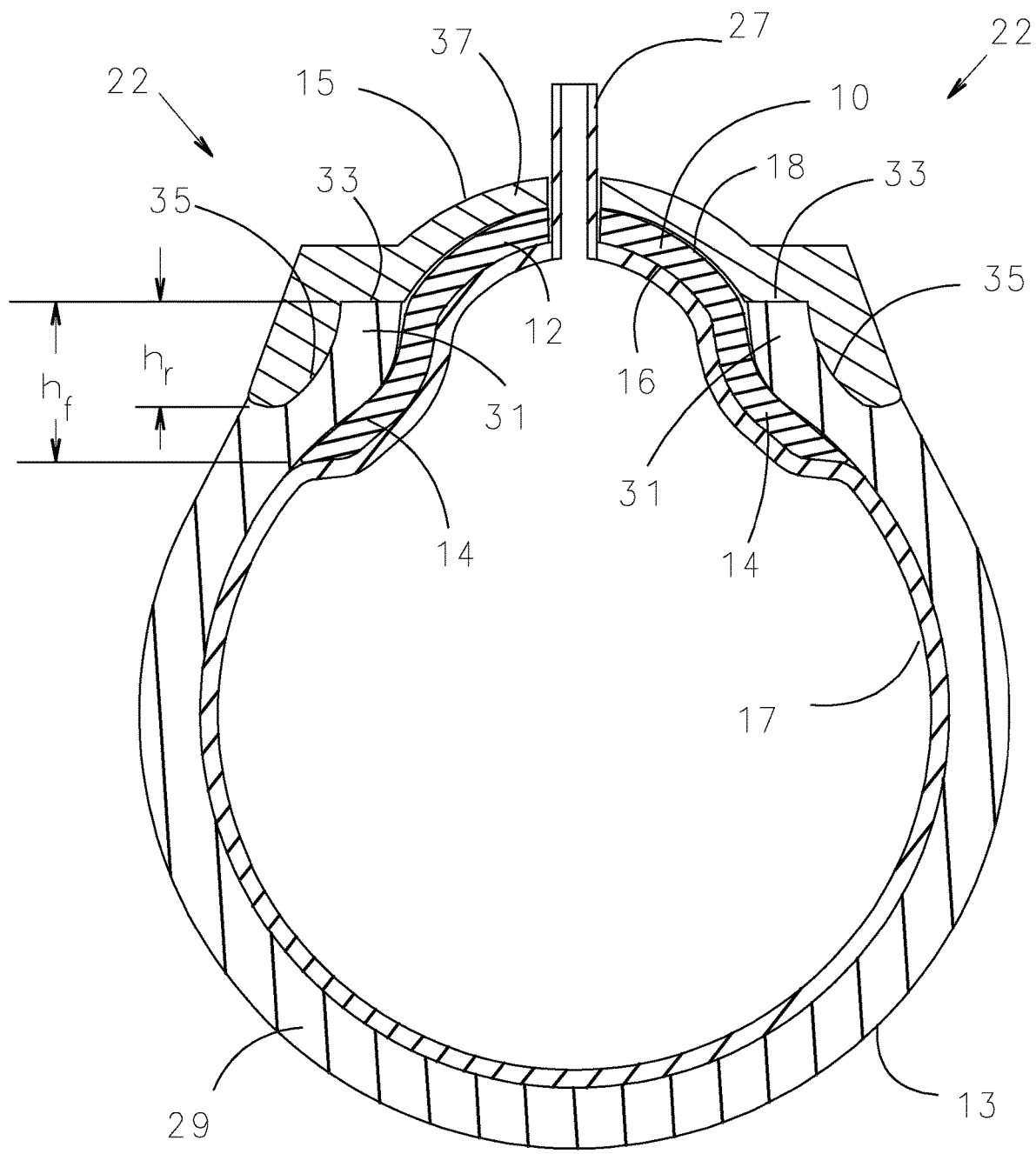
FIG. 11 is the cross-sectional view of FIG. 10 of the present invention at the valve stem with the tube inflated.
Figure 12:
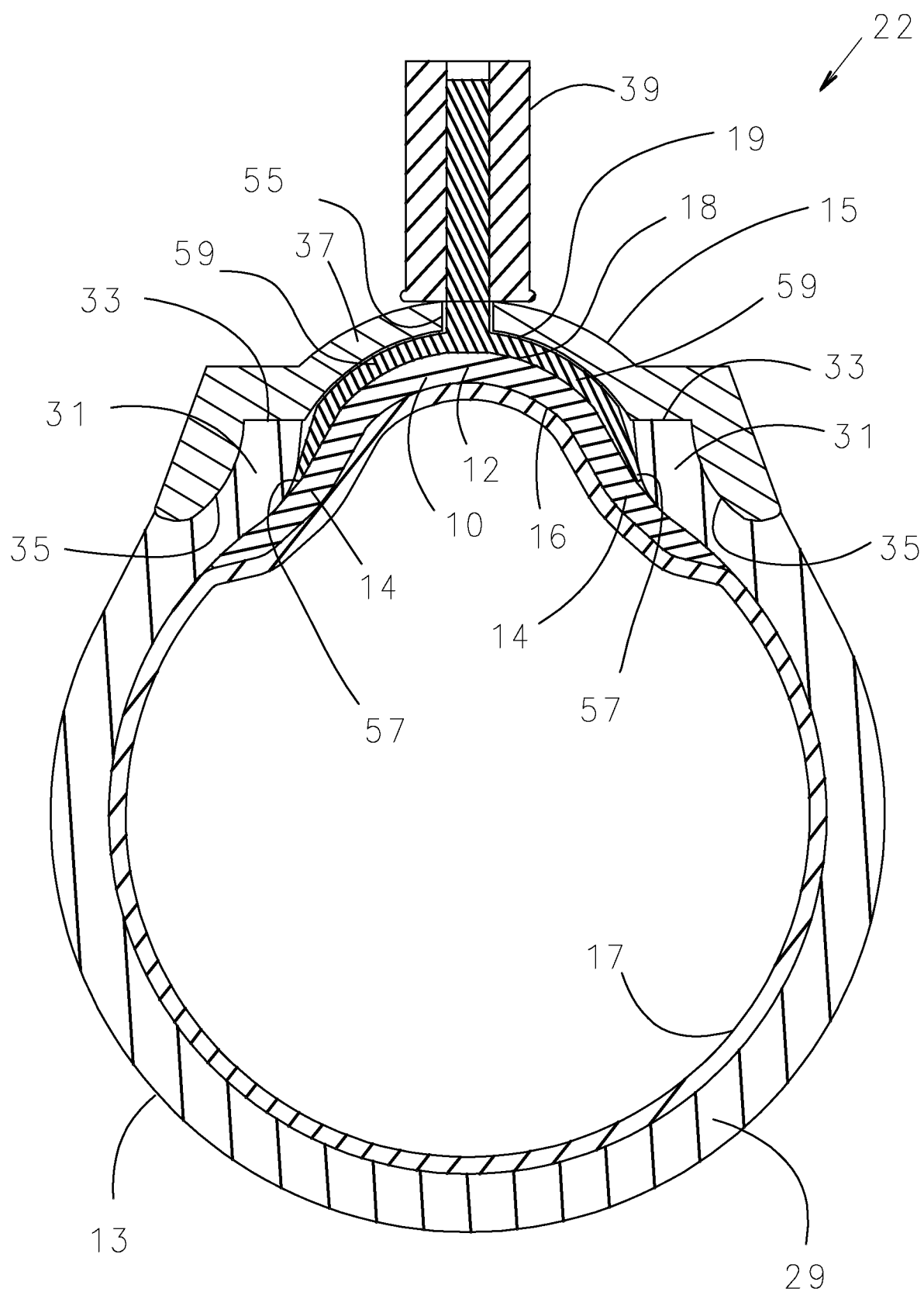
FIG. 12 is a cross sectional view of FIG. 9 of the present invention at the rim lock with the tube inflated.
Figure 13:
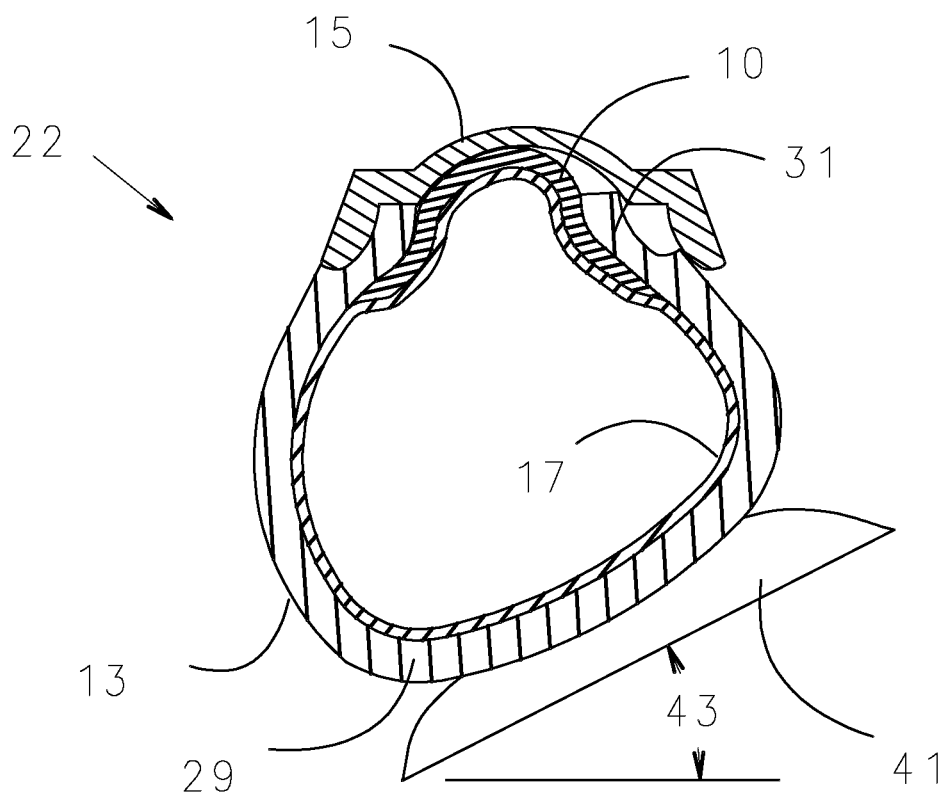
FIG. 13 is a cross sectional view of FIG. 9 of the present invention illustrating how the first type pinch flat is avoided.

Referring now to FIGS. 9-14 is illustrated the tire flap 10 of the present invention in combination with an off-road tire assembly 22. FIG. 10 shows a cross-section along the valve stem 27 with the tube deflated. The internally facing surface 16 of the tire flap 10 is positioned against the inner tube 17, and the externally facing surface 18 of the tire flap 10 is positioned against the arcuate beadwell of the rim 37, the rim lock 19 (FIG. 12), and the beads of the tire 31. Referring to FIG. 10, the initial thickness "t" of the tire flap 10 adjacent the bead 31 of the tire 13 should be at least about 1.5 times the thickness of the inner tube 17 so as to provide enough foam material in this area to absorb the shear stresses from the second type pinch flat discussed above. It is to be pointed out that this thickness will decrease over time due to compression of the tire flap 10 as the tire assembly 22 is inflated and used; hence the initial thickness refers to the thickness prior to installation and use of the tire flap 10. Preferably the initial thickness "t" should be at least about four times the thickness of the inner tube 17. The thickness of the C-cup portion 12 need only be enough to prevent it from being trapped between the bead of the tire 31 and the rim 15 in the event of the first type pinch flat condition, as shown in FIG. 13. For ease of manufacture these thicknesses are preferably the same, although they may be different, if desired.

Figure 14:
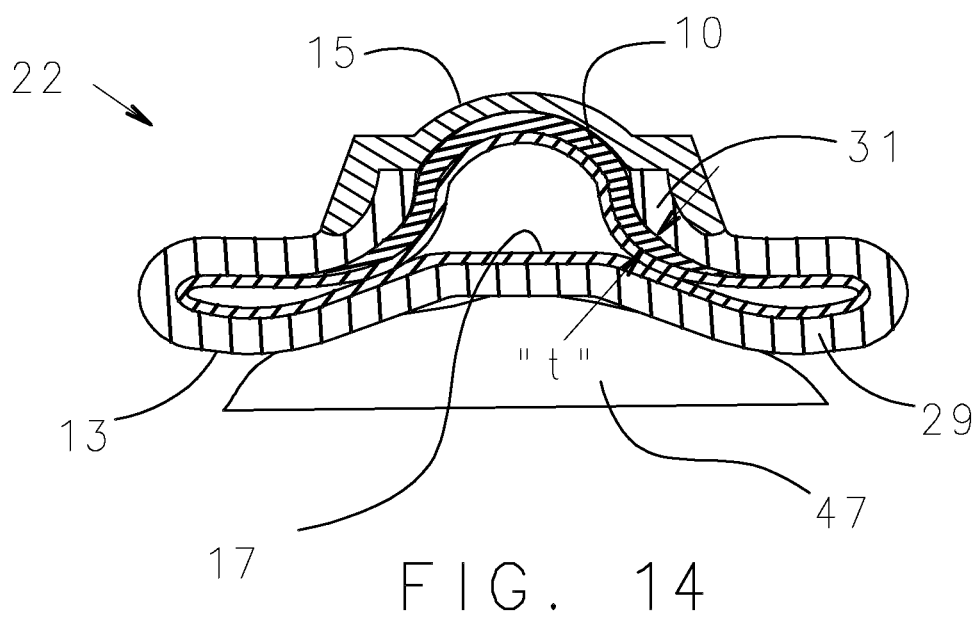
FIG. 14 is the cross sectional view of FIG. 13 of the present invention illustrating how the second type pinch flat is avoided.

FIG. 11 shows the cross-section of FIG. 10 after the inner tube 17 has been inflated to seat the bead 31 of the tire 13 on the rim 15, and with the pressure set to a desired low pressure, such as 8 psi. In a preferred embodiment, the distance "$h_f$" of the wing portions 14 must be at least 120% the height "$h_r$" of the vertical lips 35 measured from the flat shelf 33 of the rim 15. This is to assure that enough length of the wing portions 14 extend into the tire about the beads 31 so as to absorb the shear stress incurred in the second type pinch flat condition, as shown in FIG. 14. Preferably, the height "$h_f$" should be between about 150% to 225% the height "$h_r$" of the rim 15 in off-road motorcycle wheel applications.

FIG. 12 shows a cross-section of the assembly 22 taken along the rim lock 19 at a second aperture 55 in the rim 15. The rigid arm extensions 59 of the rim lock 19 positively secure a portion of the tire beads 31 against the vertical lips 35 and flat shelf 33 of the rim 15 at location 57, when the rim lock nut 39 is tightened. It is critical that this nut 39 is securely tightened to prevent the tire from spinning on the rim during acceleration and braking, particularly when operating the assembly 22 at low tire pressures. Also seen in FIG. 12, is that the externally facing surface 18 of the tire flap 10 is adjacent the rim lock 19 along the rigid arm extensions 59. Hence, the tire flap 10 prevents contact between the inner tube 17 and the rim lock 19.

FIG. 13 shows the present invention off-road tire assembly 22 in the condition of the first type pinch flat impacting object 41 at angle 43. Although the bead 31 of the tire 13 has been pushed into the arcuate beadwell 37 of the rim 15, the foam tire flap 10 has sufficient thickness and resilience to resist being caught between the bead and the rim, and thus protects the inner tube 13 from the first type pinch flat discussed in conjunction with FIGS. 4 and 5.

FIG. 14 shows the present invention off-road tire assembly 22 in the condition of the second type pinch flat impacting object 47. By the proper selection of foam material and providing a sufficient initial thickness "t" of the foam tire flap 10 adjacent the bead of the tire 31, the flap is able to absorb the shear stresses incurred in this type impact instead of the inner tube 17, thus preventing the second type pinch flat discussed in conjunction with FIGS. 6 and 7.

Figure 15:
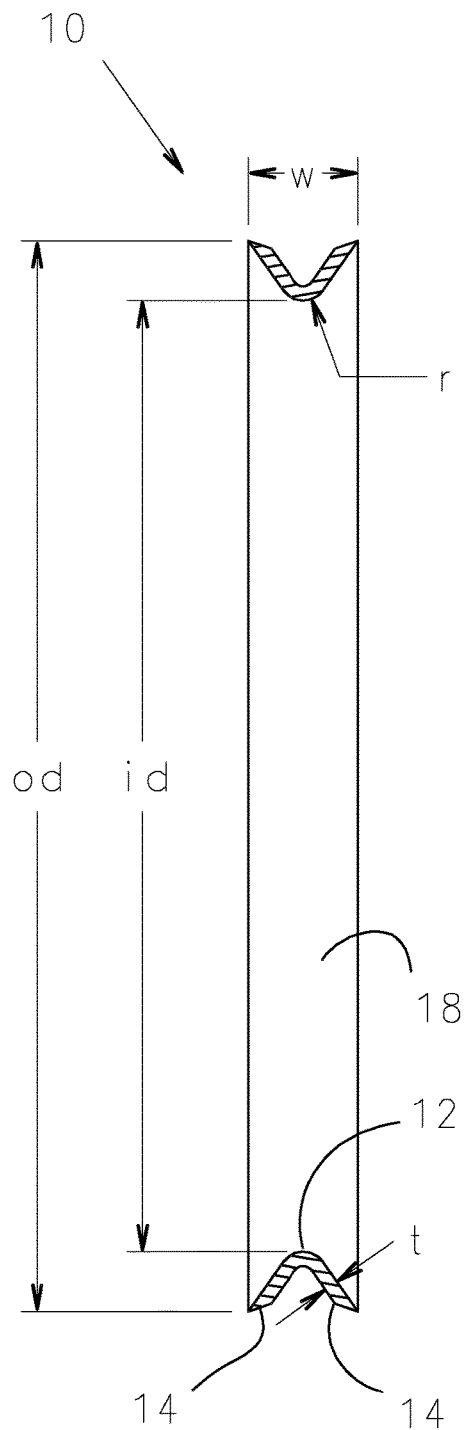
FIG. 15 is a cross sectional view of a tire flap of the present invention for use with a 21 inch rim front motorcycle wheel assembly.

A preferred embodiment tire flap for use with a 21 inch rim front motorcycle wheel assembly is shown in FIG. 15. The mold to make the flap has an inside diameter "id" of 21.0 inches, an outside diameter "od" of 23.6, a width "w" of 2.45 inches, and a radius "r" of 0.55 inches. The mold is separable at its center in order to remove the tire flap once it is formed. In this embodiment the 21 inch rim has a height "$h_r$" of the vertical lips of about 0.500 inches, and the resulting tire flap formed has a height "$h_f$" of about 1.06 inches when mounted on the rim. This establishes a height "$h_f$" that is 212% the height "$h_r$" of the rim. The flap is formed from a cross-linked polyethylene sheet foam of a density of 2 lb/ft$^3$ obtained from Foam Factory, Inc. of Township, Mich. The foam is laminated together by heat bonding the sheets about the mold. Satisfactory results have been achieved using two sheets of material, one being ¼" thick and the other being ¹⁄₁₆" thick for a combined initial thickness of 0.3125 inch. There are generally three sizes of inner tubes available, standard tubes having a thickness of 0.065 inches, heavy duty tubes having a thickness of 0.120 inches, and ultra heavy duty tubes having a thickness of 0.150 inches. Hence, in this embodiment the initial thickness of the foam tire flap is 2.1 times greater than the thickness of the thickest tube available for this application, and 4.8 times greater than the thickness of the thinnest tube available for this application.

Figure 16:
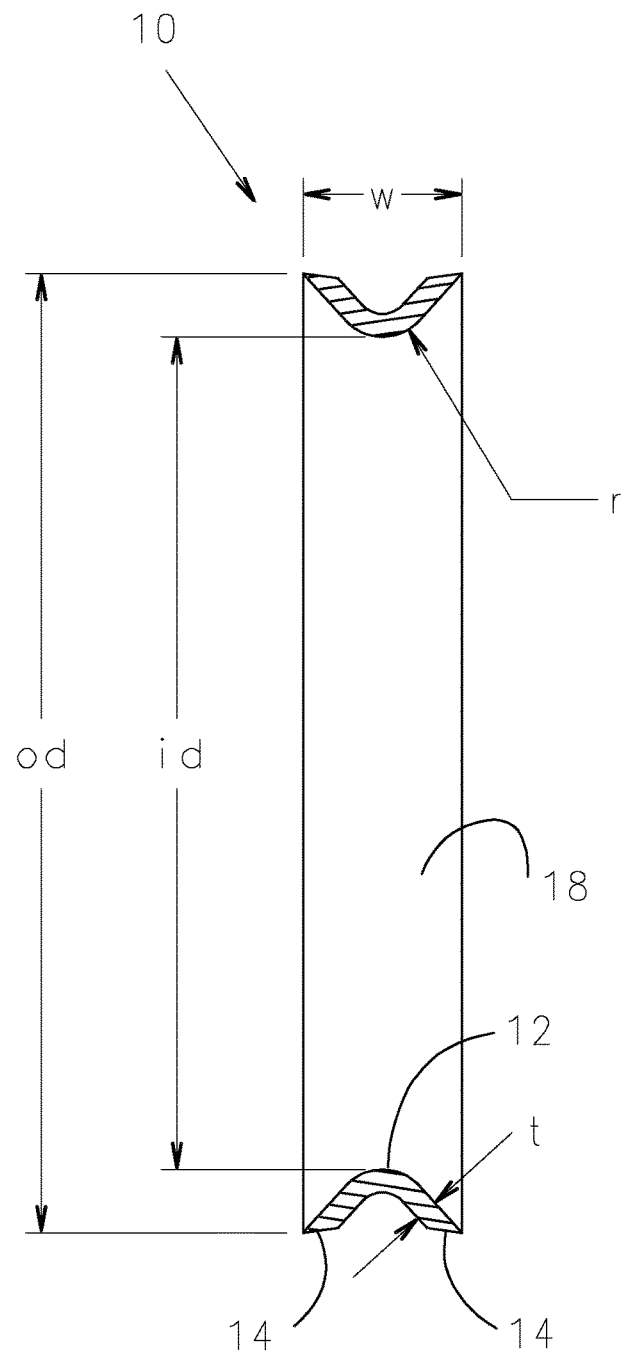
FIG. 16 is a cross sectional view of a tire flap of the present invention for use with an 18 inch rim rear motorcycle wheel assembly.

Another preferred embodiment tire flap for use with an 18 inch rim rear motorcycle wheel assembly is shown in FIG. 16. The mold to make this flap has an inside diameter "id" of 18.4 inches, an outside diameter "od" of 21.1 inches, a width "w" of 3.5 inches, and a radius "r" of 1.1 inches. In this embodiment the 18 inch rim has a height "$h_r$" of the vertical lips of about 0.545 inches, and the resulting tire flap formed has a height "$h_f$" of about 0.96 inches when mounted on the rim. This establishes a height "$h_f$" that is 176% the height "$h_r$" of the rim. The flap is formed from the same cross-linked polyethylene sheet foam of the previous embodiment. In this embodiment the flap is laminated together by heat bonding two ¼ inch thick sheets about the mold for a combined initial thickness of 0.500 inch. The inner tube thickness available for an 18 inch rim are the same as those for the 21 inch rim discussed above. Hence, in this embodiment the initial thickness of the foam tire flap is 3.3 times greater than the thickness of the thickest tube available for this application, and 7.7 times greater than the thickness of the thinnest tube available for this application.

Tire flaps made in the embodiments shown in FIGS. 15 and 16 have been installed on off-road dirt bikes and successfully operated at tire pressures between 4-8 psi in extreme off-road conditions without incurring a single pinch flat. The tire flaps are extremely lightweight (about 1-2 ounces), and have been successfully tested with the lightest weight, thin walled inner tubes. This makes the present invention tire flap, when used with thin walled inner tubes installed on motorcycle wheel assemblies, lighter than any of the prior art wheel assembly approaches discussed in the background of the invention, with the possible exception being the tire ball approach. Nonetheless, it desirably reduces the weight and the moment of inertia of the assembly, which improves suspension performance and vehicle acceleration, an advantage highly sought after in the motocross community.

Although the embodiments shown in FIGS. 15 and 16 are made from molds separable about their center, and the flaps are made by heat lamination of sheet polymer foam, it is envisioned to produce injection molds so that the tire flaps can be manufactured by injection molding the polymer foam material into the mold at a desired foam density. Alternatively, the flaps could be formed into a loop and machined to the desired shape.

In an alternative embodiment, the foam internally facing surface 16 of the tire flap 10 is bonded in position on the inner tube 17 so they can be installed as a single piece during assembly. In this embodiment the present invention comprises a tire flap inner tube combination. Such bonding could be accomplished with an appropriate adhesive or, if possible, by heat bonding or equivalent process.

The tire flap of the present invention has wide application for off-road vehicle wheel assemblies operated at low tire pressures. For example, off-road dirt bikes, motocross bikes, and dual sport bikes would benefit immensely by being able to operate at low tire pressures with the present invention which is simple, inexpensive, and easy to install solution to eliminating tube flats. Road bikes would also benefit, particularly those which are used both on and off-road. In addition, off-road motorcycles that operate with rear trial tires would benefit as well. Trial tires have relatively soft tire sidewalls and are not intended for high speed operation, but when installed on off-road motorcycles that are operated at high speed, it is not uncommon to pinch the tube as explained herein.

It is to be appreciated by those skilled in the art that tires on off-road vehicles such as motorcycles are subjected to extreme deflection during use compared to their counterparts on cars and trucks. Such deflection forces generate a substantial amount of friction and heat for any foam material used in the tire assembly. Hence, off-road tire assemblies are a poor environment for the insertion of any foam material inside the tire, and any such material will be subject to disintegration. The solid foam inserts currently available from Michelin and Dunlop corporations have been specifically engineered to withstand such environments with the assistance of lubrication. They are made from tight closed cell butyl honeycomb foam, with the cells pressurized with nitrogen gas, and have a smooth outer skin to seal in the nitrogen gas. The outer skin must be heavily lubricated when installed in the tire. Those skilled in the art would understand that if a solid foam insert were made from the low density foams selected for the present invention, that it would have no chance of surviving the deflective environment inside an off-road tire, and would fail by almost immediate disintegration. Hence, those skilled in the art would reject the idea of using any of the low density foams selected for the present invention inside an off-road tire assembly.

However, what those skilled in the art shall appreciate, upon a reading of the present invention, is that such low density foams can be used inside an off-road vehicle tire assembly as a tire flap. It is significant that the tire flap of the present invention resides adjacent the beads of the tire and the arcuate beadwell of the rim. Further, the thickness of the tire flap does not significantly protrude inside the central portion of the tire. As such, the tire flap of the present invention is not subjected to the extreme deflective environment occurring in the central portion of the tire adjacent the main section 29 of the tire. As those skilled in the art shall appreciate, the tire flap of the present invention generally rests statically inside the tire assembly and is only subjected to an even compression load of the low inflated inner tube. This compression settles the C-cup portion to conform to the internal shape of the rim, nipples and bead of the tire. Generally, the only time the tire flap is subjected to deflection is during an impact with an object that could cause the first or second type pinch flat. Hence, when operation of an off-road vehicle in extreme off-road conditions, the inner tubes and tires will be continuously subjected to violent deflections, yet the tire flap may only be deflected from the occasional first and/or second type pinch flat impact. In short, it is believed the inner tube and the tire takes generally about 98% of the abuse of the extreme deflective environment inside the tire, with the polymer foam tire flap of the present invention taking only about 2% of this abuse. Because of this, the low density polymer foams of the present invention tire flap can be effectively used inside the extreme deflective environment of an off-road tire assembly, contrary to conventional wisdom in the art.

It has been found that initial prototypes of the present invention made from extruded polyethylene foam have proven satisfactory in eliminating pinch flats while operating an off-road motorcycle at extremely low tire pressures (4 psi to 8 psi). Further prototypes made from cross-linked polyethylene foam provided greater longevity of the flap. Riding over extreme off-road conditions and consuming 3 sets of tires, the prototype tire flaps prevented any pinch flat. After being used with 3 sets of tires, the wing portions of the tire flap start to show signs of degradation and significant reduced thickness in the wing portions and at the C-cup portion at the rim lock. However, even with this reduced thickness, the tire flaps still performed satisfactorily. It is believed this is due to starting with an initial thickness "t" of the tire flap near the bead of the tire being 4 to 7 times the thickness of the inner tube. Eventually, the tire flap of the present invention will need to be replaced after significant use. This is believed to be satisfactory as they are intended to be inexpensive compared to the cost of an off-road tire, and can be used at least through the consumption of about 3 or 4 sets of tires.

Assembly and disassembly of the present invention tire flap simple compared to the solid foam, tire ball, and pneumatic seal approaches. It is no more difficult or different than mounting of conventional inner tube tire assemblies. First, one bead of the tire is pulled onto the rim around the arcuate beadwell of the rim as usual. Second, the rim lock is positioned inside the rim through the aperture provided in the rim as usual. Next, the tire flap is positioned inside the inner tube with the valve stem protruding though the aperture provided in the tire flap. The flap and tube are then inserted into the rim, and the valve stem is pushed through the aperture in the rim for the valve stem. The rest of the inner tube and tire flap are pressed into the tire and rim. Finally, using tire irons, the final bead of the tire is pried over the rim as usual, and the tube is pressurized to seat the bead of the tire in the rim. The rim lock is then tightened, and the tube is de-pressurized to a desired low pressure. A significant advantage of the present invention foam tire flap is that during installation or un-installation the tire flap protects the inner tube from any interaction with tire irons used in pulling the bead of the tire over the rim. Hence, the tire flap protects against installation un-installation tube pinches that are frequently incurred by improper use of the tire iron.

What has been described are preferred embodiments of a foam tire flap for off-road tire assemblies. Those skilled in the art will appreciate that numerous modifications are possible without materially departing from the novel teachings and advantages of the subject matter described herein. Other modifications, substitutions, changes, and omissions may be made in the design and arrangement of the preferred and other exemplary embodiments without departing from the spirit of the present invention.

What is claimed is:

1. A flap for an off-road tire mounted on a safety rim having a rim lock with a inner tube installed in between the tire and the rim, the flap comprising:
   a continuous cylindrical C-cup portion having a central aperture for receiving a valve stem of the inner tube, the C-cup portion having a wing portion on both ends forming an internally facing surface and an externally facing surface, the internally facing surface of the flap designed to be positioned against the inner tube, the externally facing surface of the flap designed to be positioned against an arcuate beadwell of the rim, the rim lock, and beads of the tire;
   the flap made from a impact absorbing foam having a density between 1.2 lb/ft$^3$ and 15.0 lb/ft$^3$, wherein the vertical lips of the rim have a height "$h_r$" measured from a flat shelf of the rim, and the wing portions of the flap extend inward a distance "$h_f$" measured from the flat shelf of the rim, the distance "$h_f$" being at least 120% but less than 225% the height "$h_r$" of the vertical lip of the; and,
   the flap having an initial thickness "t" adjacent beads of the tire, the thickness "t" being between 0.225 and 0.60 inches.

2. A flap for an off-road tire as claimed in claim 1 wherein the distance "$h_f$" being at least between 150% and 225% the height "$h_r$" of the vertical lip of the rim.

3. A flap for an off-road tire as claimed in claim 1 wherein the impact absorbing foam is selected from the group consisting of: expanded polystyrene foam, expanded polyethylene foam, cross-linked polyethylene foam, expanded polypropylene foam, extruded polyethylene foam, polyurethane foam, vinyl nitrile foam, and neoprene.

4. A flap for an off-road tire as claimed in claim 1 wherein the tire flap is made from a cross-linked polyethylene foam.

5. A combination comprising:
   an off-road tire to be mounted on a safety rim of a wheel, the tire including a main section terminating at two beads;
   the rim having a generally flat shelf located between two upturned vertical lips in between a downturned arcuate beadwell, the beads of the tire being mounted adjacent the vertical lips of the rim and flat shelf when the tire is mounted on the rim, the vertical lips having a height "$h_r$";
   an inner tube having a valve stem and a thickness, the inner tube installed in between the tire and the rim, the rim having an aperture in the arcuate beadwell for receiving the valve stein,
   a rim lock installed on the rim, the rim having a second aperture in the arcuate beadwell for receiving the rim lock, the rim lock positively securing a portion of the tire beads against the vertical lips and flat shelf of the rim;
   a tire flap having a continuous cylindrical C-cup portion having a central aperture for receiving the valve stem of the inner tube, the C-cup portion having a wing portion on both ends forming an internally facing surface and an externally facing surface, the flap installed with the internally facing surface positioned against the inner tube and the externally facing surface positioned against the acuate beadwell of the rim, the rim lock, and the beads of the tire, the wing portions extending inward in the tire a distance "$h_f$" of at least 120% but less than 225% the height "$h_r$" of the vertical lip of the rim measured from the flat shelf of the rim, the flap made from an impact absorbing foam having a density between 1.2 lb/ft$^3$ and 15.0 lb/ft$^3$ and having an initial thickness "t" adjacent the bead of the tire that is at least about 1.5 times the thickness of the inner tube; and,
   the flap having an initial thickness "t" adjacent beads of the tire, the thickness "t" being between 0.225 and 0.60 inches.

6. The combination as recited in claim 5 wherein the wing portions extend inward in the tire a distance "$h_f$" of at least between 150% and 225% the height "$h_r$" of the vertical lip of the rim measured from the flat shelf of the rim.

7. The combination as recited in claim 5 wherein the impact absorbing foam is selected from the group consisting of: expanded polystyrene foam. expanded polyethylene foam, cross-linked polyethylene foam, expanded polypropylene foam, extruded polyethylene foam, polyurethane foam, vinyl nitrile foam, and neoprene.

8. The combination as recited in claim 5 wherein the tire flap is made from a cross-linked polyethylene foam.

9. A combination flap and inner tube for an off-road tire mounted on a safety rim having a rim lock with a inner tube installed in between the tire and the rim, the inner tube having a thickness and the tire having a bead, the combination comprising:
   a inner tube having a valve stem and designed to be installed in between the tire and the rim;
   a flap having a continuous cylindrical C-cup portion, the C-cup portion having a aperture and a wing portion on both ends forming an internally facing surface and an externally facing surface, the internally facing surface bonded to the inner tube with the aperture receiving the valve stem, the externally facing surface of the flap designed to be positioned against an arcuate beadwell of the rim, the rim lock, and the beads of the tire;
   the flap made from a impact absorbing foam having a density between 1.2 lb/ft$^3$ and 15.0 lb/ft$^3$, wherein the vertical lips of the rim have a height "$h_r$" measured from a flat shelf of the rim, and the wing portions of the flap extend inward a distance "$h_f$" measured from the flat shelf of the rim, the distance "$h_f$" being at least 120% but less than 225% the height "$h_r$" of the vertical lip of the rim; and,
   the flap having an initial thickness "t" adjacent beads of the tire, the thickness "t" being between 0.225 and 0.60 inches.

10. A combination as claimed in claim 9 wherein the distance "$h_f$" being at least between 150% and 225% the height "$h_r$" of the vertical lip of the rim.

11. A combination as claimed in claim 9 wherein the impact absorbing foam is selected from the group consisting of: expanded polystyrene foam, expanded polyethylene foam, cross-linked polyethylene foam, expanded polypropylene foam, extruded polyethylene foam, polyurethane foam, vinyl nitrile foam, and neoprene.

12. A combination as claimed in claim 9 wherein the tire flap is made from a cross-linked polyethylene foam.

\* \* \* \* \*